Oct. 1, 1929.  S. B. SHELDON  1,729,750
WATER COOLED PORT FOR OPEN HEARTH FURNACES
Filed May 4, 1927   2 Sheets-Sheet 1
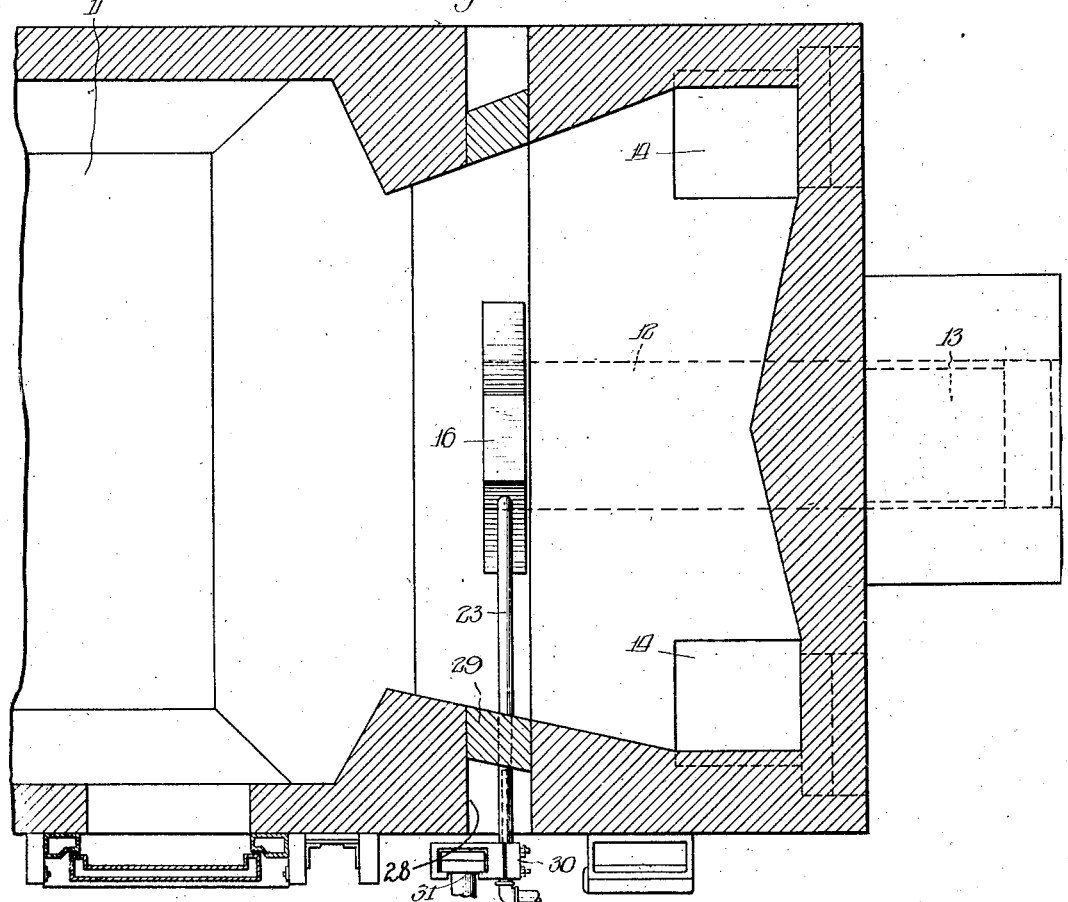
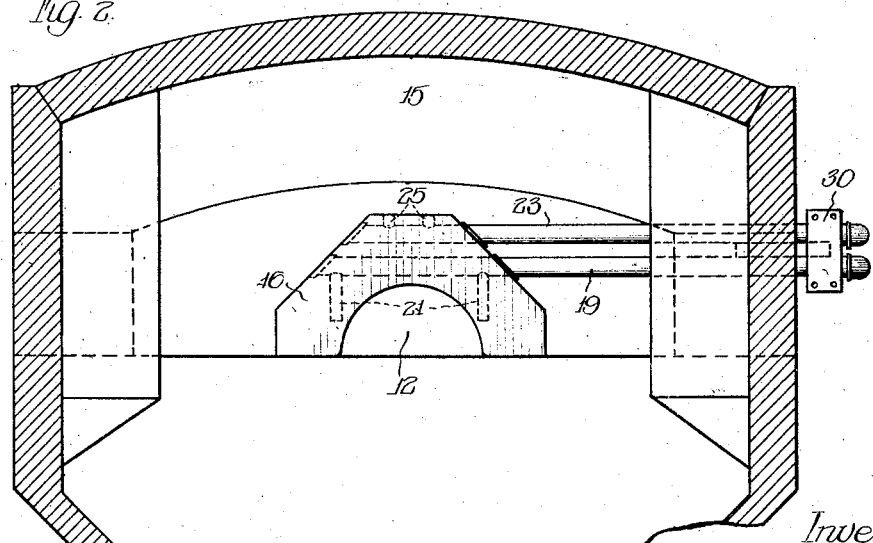
Witness:
A. Burkhardt.
Inventor:
Samuel B. Sheldon,
By S. Anthony Hsina
Atty.

Oct. 1, 1929.  S. B. SHELDON  1,729,750
WATER COOLED PORT FOR OPEN HEARTH FURNACES
Filed May 4, 1927  2 Sheets-Sheet 2
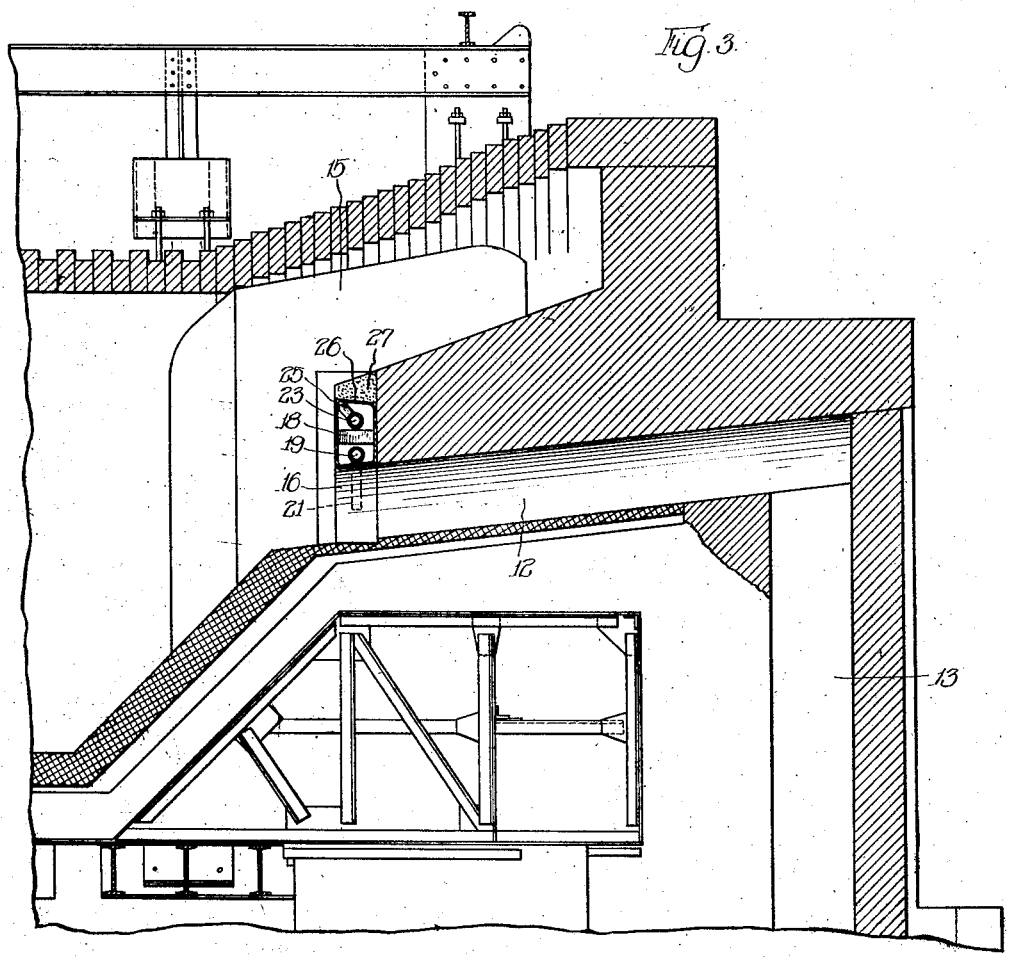
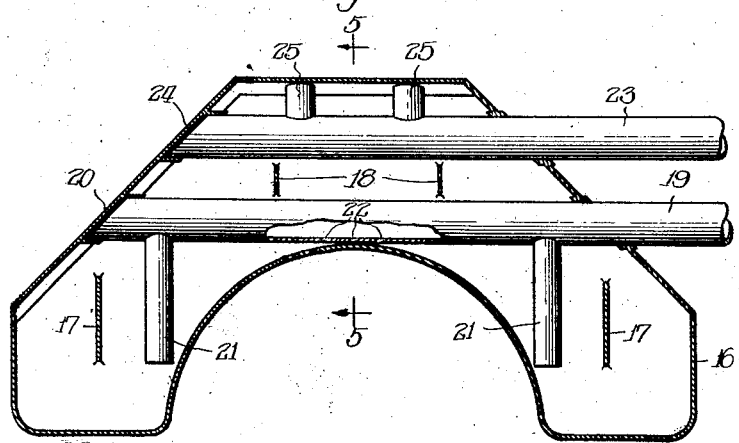
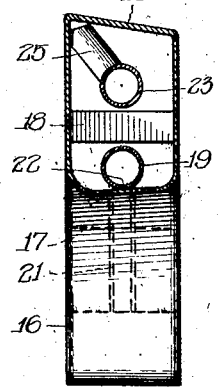

Patented Oct. 1, 1929

1,729,750

UNITED STATES PATENT OFFICE

SAMUEL B. SHELDON, OF DULUTH, MINNESOTA

WATER-COOLED PORT FOR OPEN-HEARTH FURNACES

Application filed May 4, 1927. Serial No. 188,678.

This invention relates to a new and improved water cooled port for open hearth furnaces, and more particularly to a water cooled construction adapted to be removably associated with the end of the gas port of such furnaces.

The open hearth furnace as generally constructed, comprises gas ports located centrally of each end of the furnace, these ports being formed of brickwork. The air is normally introduced surrounding the gas port. In the operation of the furnace the direction of flow of gas and air is periodically reversed so that each gas port has directed against it the high temperature products of combustion during one-half of the cycle of operation of the furnace. These heated gases of combustion serve to wear away the port and thus shorten its life. A port which is worn away from its normal lines is not so efficient in producing the desired mixture of gas and air and properly projecting the flame on the bath of metal in the furnace. An improper mixture and poorly directed flame may cause slow combustion and the flame itself may impinge upon the outgoing end of the furnace and further aggravate the difficulty.

Because of the foregoing difficulties, various devices have been developed for protecting the gas port of a furnace and for maintaining its lines. Many of these devices involve a very large amount of water cooling with consequent heat loss in the furnace. These prior constructions also involve metal water holding members which are built into the port and become a permanent part thereof. It is therefore impossible to remove and replace a damaged water cooling element without cooling down the furnace and rebuilding the port.

It is an object of the present invention to provide a water cooling element for open hearth furnace ports or the like which may be removed and replaced without material interferences with the normal furnace operation.

It is a further object to provide an element of this character which serves to protect only the portion of the port directly exposed to the flow of outgoing gases.

It is an additional object to provide a construction with a minimum of water cooled area and consequent minimum heat loss through its use.

Other and further objects will appear as the description proceeds.

I have illustrated a preferred embodiment of my invention in the accompanying drawings; in which Figure 1 is a plan view of one end of a furnace equipped with my invention;

Figure 2 is a vertical transverse section looking toward the furnace end;

Figure 3 is a vertical longitudinal section taken on the middle line of the port;

Figure 4 is a sectional view of the water cooling element, parts being broken away to show the construction; and Figure 5 is a transverse section taken on line 5—5 of Figure 4.

As shown in the drawing, the furnace may be of usual type having the melting chamber 11 and gas port 12, which port receives its gas through the gas uptake 13. The air uptakes 14 deliver air through the wide air port 15 which extends over the gas port structure, being separated from the gas port 12 by the sloping tongue member. The metal cooling member 16 is placed directly in front of the gas port, as best shown in Figure 3, and is arcuate in form so as to form a continuation of the gas port 12.

This member 16 may be formed of a metal casting, which, as shown in detail in Figure 4, is provided with the transverse reenforcements 17 and 18. The water feed pipe 19 extends into the side of the port and has its end secured to and closed by the opposite side of the cooling member at 20. The pipe 19 is provided with the downwardly extending water discharge pipes 21 which direct the incoming water toward the lower portion of the cooling element. The pipe 19 may also be provided with perforations 22 so as to direct a portion of the cooling water directly above the arch of the gas port.

The discharge water pipe 23 extends similarly into the cooling element and has its inner end secured thereto and closed by the wall of the cooler at 24. This pipe 23 is provided with the offtake pipe 25 which extends upwardly into the highest portion of the cooling member. It will thus be seen that the cooled water is directed into the lower portion of the cooling member and that the water is withdrawn from the top of the member where the water will be hottest. A complete cooling circulation is thus insured. The top 26 of the cooling member is preferably sloped as indicated in Figures 3 and 5, so that when in position in the furnace it will retain a covering 27 of refractory material which may be packed on to the cooling element before it is inserted in the furnace or which may be deposited upon it after it is placed adjacent the end of the gas port.

As best shown in Figure 1, the cooling pipes 19 and 23 extend out through the side of the furnace and this portion of the side of the furnace has an opening 28 which is closed by a temporary wall 29. The opening 28 is of sufficient size so that the entire cooling assembly may be inserted or withdrawn as a unit. Outside of the furnace the pipes 19 and 23 are connected by a collar 30 which is formed with the recess portion 31 adapted to receive the end of the operating member of a furnace charging machine so that this machine may be used for inserting and removing the cooling element.

It will be apparent that this element adequately protects the port end which is subject to the eroding action of the heated gases. The element is comparatively small and simple in its construction and thus minimizes the heat losses due to the circulating water. The element may be quickly withdrawn and replaced by a new one without material delay in the furnace operation.

While I have shown in detail one preferred form of construction, it is to be understood that the apparatus is capable of wide variation, and I contemplate such changes and modifications as come within the spirit and scope of the appended claims.

I claim:

1. A furnace construction comprising, in combination, a port for the admission of gases to the interior of the furnace, a shelf formed adjacent to the point of communication between the port and the interior of the furnace, and a water cooled frame mounted on the shelf and provided with an opening co-extensive with the sides and top of the port, said frame being movable to effect its removal from and insertion into the furnace.

2. A furnace construction comprising, in combination, a port for the admission of gases to the interior of the furnace, a shelf formed adjacent to the point of communication between the port and the interior of the furnace and a water cooled frame mounted on the shelf and provided with an opening co-extensive with the sides and top of the port, said frame being movable in a sidewise direction to effect its removal from and insertion into the furnace.

3. A furnace construction comprising, in combination, a plurality of side walls, a port communicating the exterior of the furnace with the space defined within the side walls, the inner end of said port being defined in part by a substantially exposed readily removable water cooled member having exposed side port defining members, the width of said member being substantially less than the width of the furnace, and a removable section formed in one of the side walls and spaced from the member, said side wall section being removable for the purpose of permitting movement of the water cooled member into and out of the interior of the furnace.

4. A furnace construction comprising, in combination, a port for communicating the exterior of the furnace with the interior thereof, and a relatively high, narrow, and elongated water cooled frame defining the top and sides of said port, said frame being movable in a sidewise direction to permit its insertion into and removal from the furnace.

5. A furnace construction comprising, in combination, a plurality of side walls, a horizontal bridge wall positioned within the furnace and arranged to divide the area in which it is located into an upper and a lower portion, the lower portion of the area being provided with side walls and a floor which together form a communicating passageway, the floor being continued beyond the end of the passageway and beyond the end of the bridge wall whereby a shelf is formed, and a water cooled member mounted on the shelf and movable thereacross to a position to define in conjunction with said shelf said passageway.

6. A furnace construction comprising, in combination, a plurality of side walls, a horizontal bridge wall positioned within the furnace and arranged to divide the area in which it is located into an upper and a lower portion, the lower portion of the area being provided with side walls and a floor which together form a communicating passageway, the floor being continued beyond the end of the passageway and beyond the end of the bridge wall whereby a shelf is formed, and a water cooled member movably mounted on said shelf and having portions cooperating with a portion of said shelf to define an opening forming a discharge for said passageway, said shelf being provided with a groove to serve as a guideway for the water cooled member during movement thereof.

Signed at Duluth, Minnesota, this 28th day of April, 1927.

SAMUEL B. SHELDON.